M. A. MYERS.
RESILIENT WHEEL.
APPLICATION FILED NOV. 1, 1916.
1,272,300. Patented July 9, 1918.
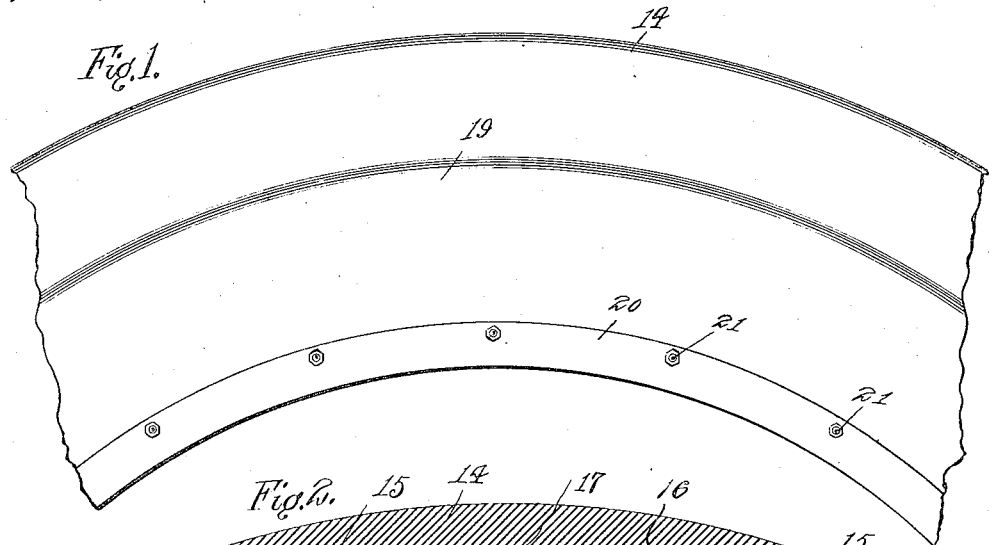
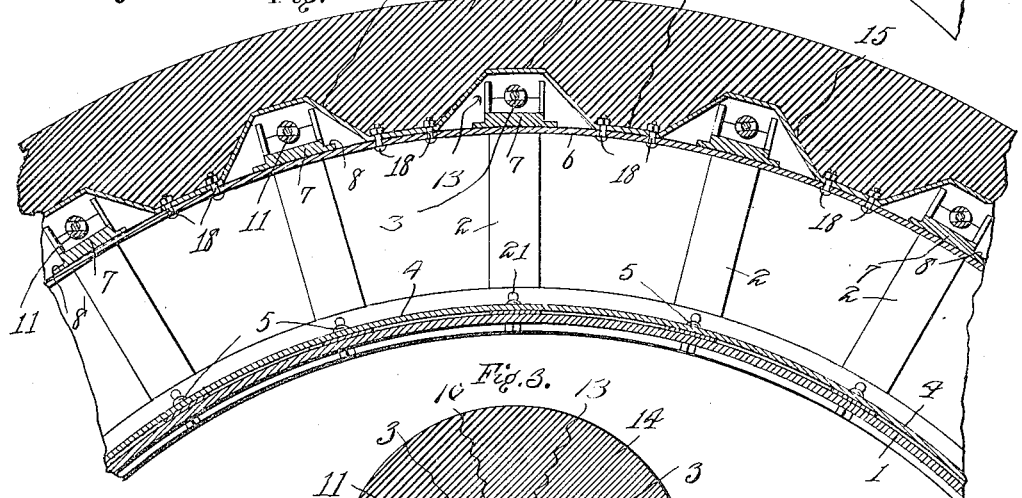

UNITED STATES PATENT OFFICE.

MELVIN A. MYERS, OF KANE, PENNSYLVANIA, ASSIGNOR OF THREE TWO-HUNDREDTHS TO H. W. SHORT, ONE TWO-HUNDREDTH TO CHAS. W. NELSON, TWO TWO-HUNDREDTHS TO F. W. SPENCER, FIVE TWO-HUNDREDTHS TO ARCHIE SHORT, THREE TWO-HUNDREDTHS TO MEADE ROBINSON, THREE TWO-HUNDREDTHS TO C. G. DAHLEN, THREE TWO-HUNDREDTHS TO LYLE F. ROBINSON, TWO TWO-HUNDREDTHS TO W. P. ZINK, THREE TWO-HUNDREDTHS TO HAROLD SPENCER, TWO TWO-HUNDREDTHS TO WILLIAM H. SPENCE, THREE TWO-HUNDREDTHS TO F. J. ROBINSON, TWO TWO-HUNDREDTHS TO NORMAN PATRICK, TWO TWO-HUNDREDTHS TO E. R. COLLINGE, THREE TWO-HUNDREDTHS TO CARL JOHNSON, THREE TWO-HUNDREDTHS TO WILLIAM FAUL, SIX TWO-HUNDREDTHS TO JOHN H. SCOTT, ONE TWO-HUNDREDTH TO G. G. FITZGERALD, TWO TWO-HUNDREDTHS TO L. DUNN, ONE TWO-HUNDREDTH TO LAURENCE OHLSON, TWO TWO-HUNDREDTHS TO G. D. LEAKE, FIVE TWO-HUNDREDTHS TO C. R. CARNAHAN, ONE TWO-HUNDREDTH TO BYRON FOULKROD, ONE TWO-HUNDREDTH TO ERNEST EMMONS, ONE TWO-HUNDREDTH TO PORTER SMITH, TWO TWO-HUNDREDTHS TO C. K. DUNN, ONE TWO-HUNDREDTH TO A. BAKER, TWO TWO-HUNDREDTHS TO ROBERT HENNELL, ONE TWO-HUNDREDTH TO AXEL E. ANDERSON, ONE TWO-HUNDREDTH TO W. W. PAUP, ONE TWO-HUNDREDTH TO T. M. McELREE, THREE TWO-HUNDREDTHS TO LEON TORPY, TWO TWO-HUNDREDTHS TO MRS. DORA ROBINSON, TWO TWO-HUNDREDTHS TO MISS RUTH ROBINSON, ONE TWO-HUNDREDTH TO MRS. STELLA KELSEY, ONE TWO-HUNDREDTH TO ADELBERT SYKES, ONE TWO-HUNDREDTH TO H. DANKS, ONE TWO-HUNDREDTH TO LLOYD SANFORD, ONE TWO-HUNDREDTH TO JOHN A. JOHNSON, TWO TWO-HUNDREDTHS TO TOM FAUL, ONE TWO-HUNDREDTH TO WILLIAM BURTON, ONE TWO-HUNDREDTH TO WILLIAM NOEL, ONE TWO-HUNDREDTH TO F. H. MICHEAU, TWO TWO-HUNDREDTHS TO WILLIAM SIMPKINS, TWO TWO-HUNDREDTHS TO NORMAN SIMPKINS, ONE TWO-HUNDREDTH TO HENRY BEARKLE, ONE TWO-HUNDREDTH TO JOE MICHEAU, TWO TWO-HUNDREDTHS TO GEORGE HART, ONE TWO-HUNDREDTH TO JOHN BLOCK, ONE TWO-HUNDREDTH TO C. A. DUNN, TWO TWO-HUNDREDTHS TO J. J. KUHNS, ONE TWO-HUNDREDTH TO E. ECKBORG, AND ONE TWO-HUNDREDTH TO BESSIE L. SHORT.

RESILIENT WHEEL.

1,272,300.      Specification of Letters Patent.      Patented July 9, 1918.

Application filed November 1, 1916. Serial No. 128,995.

*To all whom it may concern:*

Be it known that I, MELVIN A. MYERS, a citizen of the United States, residing at Kane, in the county of McKean and State of Pennsylvania, have invented certain new and useful Improvements in Resilient Wheels, of which the following is a specification.

The present invention has reference, generally, to resilient wheels.

The invention has for its principal object to provide a wheel in which, the rim thereof will be resiliently supported, thereby, permitting the same to absorb such shocks to which it may be subjected during travel over rough or ill-graded roads, thereby, preventing the disagreeable jolting of the occupants of the vehicle.

As an object of equal importance, the invention aims to provide means whereby, the resilient cushioning means for supporting the rim may be adjusted in rigidity, thus, affording a wheel which can be adapted for loads of various weights.

Among other aims and objects of the invention may be recited, the provision of a wheel of the character mentioned with a view to compactness, and in which the number of parts are few, the construction simple, and the cost of production small.

Other and further improvements and novel details in the construction and arrangement of parts will be appreciated from the description to follow, which, for a clear understanding of the invention should be considered in connection with the accompanying drawings, forming a part thereof and wherein a preferred embodiment of the invention is shown for the purpose of illustration.

In the drawings:

Figure 1 is a fragmental side elevation of the improved wheel,

Fig. 2 is a fragmental longitudinal section therethrough,

Fig. 3 is a transverse section, and

Fig. 4 is a detail in perspective of the seat for the adjusting means.

Similar characters of reference are employed in all of the above described views, to indicate corresponding parts.

Referring now in detail to the several figures of the said drawings, the present improvements are adapted to be used in conjunction with the ordinary form of vehicle wheel, which includes a hub, spokes and a rim. An inner rim 1 is provided and has arranged upon the outer peripheral face thereof, a plurality of spaced apart spring supporting elements, which elements comprise single pieces of strap spring metal, portions of which are bent outwardly to form sides 2. The extremities of the sides 2 are rounded and are provided with exteriorly screw threaded studs 3, the purpose of which will be hereinafter described. To secure the spaced apart springs in position, a band 4 is arranged over the base portions thereof and is secured to the rim 1, through the medium of bolts 5 or the like, it being noted, that the said bolts are engaged with each of the springs, thereby, maintaining the same in proper position, irrespective of any strain which may be applied thereto.

An outer rim 6 is arranged between the outer or free ends of the spring side strips 2, in spaced relation from the inner rim 1 and is preferably formed of a suitable spring metal, thereby, permitting the same to flex. To provide means whereby the screw threaded stud 3 of the sides 2 can be connected to the outer rim 6 and the rigidity thereof adjusted to suit various conditions, the outer ends of the said sides are received upon chairs 7, which are provided with flanged portions 8, the flanged portions having suitable openings 9 therein, adapted to receive screws or the like, thus, providing means for securing the chairs to the rim 6. The opposite ends of the chairs, are rounded, as at 10 and as will be evident, afford means whereby the free ends of the sides 2 may be readily engaged therewith and moved thereover during adjustment. Turn buckles 11 are connected with each pair of oppositely disposed screw threaded studs 3 and are received within pockets 12, formed in the chairs 7, the said pockets preventing lateral movement of the turn buckles with relation to the rim 6. By this means, upon rotating the turn buckles 11, the free ends of the spring sides 2 will be drawn to each other or moved apart, thus, increasing or decreasing the rigidity thereof and permitting the wheel to be abjusted for various loads. To facilitate turning of the turn buckles 11, portions of the sides of the chairs 7 are cut away, as at 13, thereby, allowing a wrench or other turning implement to be engaged therewith.

As an additional cushioning means, a rubber or other similar form of cushion tire 14 is arranged about the peripheral surface of the outer rim 6 and has portions thereof recessed as at 15, in order that the same may be arranged about the various turn buckles 11 and chairs 7 which are arranged upon the said outer rim 6. To brace the tire, a circular band 16 is disposed between the tire and the outer rim 6, thereby, preventing the collapsing or flexing of the tire at points adjacent the recessed portions 15, and consequently preventing interference thereof with the turn buckles 11. If desired, the tire may be secured to the circular band 16, by means well known in this art. It is to be noted, that off-set portions 17 are formed throughout the length of the band 16 and are so arranged as to be received by the recessed portions 15 of the cushion tire. To secure the band 16 to the outer rim 6, bolts 18 are employed and are passed through the said band and rim whereupon nuts are threaded on the ends thereof so that the band 16 may be removed as will later appear. Side portions 19 are formed upon the tire 14 and extend to a point adjacent the inner marginal edge of the inner rim 1, whereupon, they are secured in position by means of metal bands 20. The bands 20 are secured in position by bolts 21, the inner ends of the bolts being engaged with a portion of the band 4 as shown in Fig. 3 and nuts being threaded on the outer ends of the bolts to permit removal of the bands 20. In providing the side portions 19, it will be apparent, that an additional securing means is afforded, thus, rendering displacement of the tire 14 practically impossible during travel of the wheel. Furthermore, the side portions 19 also constitute an efficient casing for preventing the accumulation of foreign matter between the spring sides 2, hence, assuring proper operation of the tire at all times.

The operation of the invention may be reviewed as follows:

Assuming that the wheel is in assembled position and it is desired to increase the rigidity of the construction, one of the securing bands 20 is removed, thereby, permitting the tire 14 and the band 16 to be also removed. A wrench or other suitable turning implement is now engaged with the various turn buckles 11, which turn buckles are rotated, thereby causing the screw threaded studs 3 of the spring sides 2 to be drawn toward each other, hence, increasing the rigidity of the sides 2 and rendering the wheel adaptable for use upon vehicles employed for hauling heavy loads. To decrease the rigidity of the construction, the turn buckles 11 are, obviously, counter-rotated whereupon the rigidity of the spring sides 2 will be decreased and the same permitted to flex under the weight of light loads, consequently, efficiently absorbing such shocks as may be directed thereto and preventing jolting of the vehicle body. It is of course to be understood, that when the desired adjustment of the spring sides 2 has been obtained, the tire and band are again moved into position upon the rim 6 and the free side 19 then reëngaged by the ring 20.

While I have herein illustrated and described with considerable degree of particularity, constructional details of the wheel embodying my invention, it is to be understood that the invention is not limited to this particular form and arrangement of the several parts, which may be modified within a wide range, without departing from the essence of the invention, the construction shown and the description based thereon being intended to be taken in an illustrative rather than a limiting sense.

I claim:

1. A spring wheel including inner and outer rims, a plurality of springs on the inner rim having ends extending beyond the outer rim, and adjusting means connected with said ends for adjusting the tension of the springs.

2. A spring wheel including inner and outer rims, a plurality of circumferentially disposed resilient members mounted on the inner and outer rims said members having free ends, means for securing the resilient members to the inner rim, and adjusting means engaged with the free ends of the resilient members for increasing or decreasing the rigidity thereof.

3. A spring wheel including inner and outer rims, a plurality of circumferentially disposed springs mounted on the inner rim said springs having free ends in engagement with the outer rim, and turnbuckles engaged with the free ends of the springs whereby the rigidity thereof may be increased or decreased upon adjustment of the turnbuckles.

4. A spring wheel including inner and outer rims, a plurality of springs mounted on the said inner and outer rims the springs having free ends terminating adjacent to the outer rim, means for fixedly securing the springs to the inner rim, turnbuckles connected with the free ends of the springs whereby the tension of the springs may be regulated, and chairs arranged upon the outer rim for receiving the turnbuckles.

5. A spring wheel including inner and outer rims, a plurality of substantially U-shaped resilient members mounted on the inner and outer rims the resilient members having free ends and base portions, the base portions being secured to one of the rims, turnbuckles connected with the free ends of the resilient members whereby the tension thereof may be regulated, chairs having recesses for receiving the turnbuckles said recesses communicating with lateral passages, said passages permitting free access to said turnbuckle and a tire arranged about said outer rim.

6. A spring wheel including inner and outer rims, a plurality of springs arranged on the inner rim having curved ends extending beyond the outer rim, chairs on the outer rim having curved ends for receiving the curved ends of the springs said chairs having recesses and passages, threaded studs secured to the ends of the springs, turnbuckles for the threaded studs adapted to be seated in the recesses of the chairs, said passage permitting free access to said turnbuckles, a resilient tire arranged on the outer rim, a supporting member for the tire arranged on the outer rim, said tire having side portions, and securing rings for the tire side portions.

7. A spring wheel including inner and outer rims, a plurality of springs including free ends and base portions the base portions being secured to the inner rim, chairs on the outer rim having curved portions for receiving the free ends of the springs, threaded studs on the ends of the springs, turnbuckles for engaging the threaded studs, a tire for the outer rim having side portions extending inwardly beyond the inner rim to form a covering, a support arranged on the outer rim for supporting the tire, and annular bands secured to the inner rim for clamping the inwardly extending portions of the tire.

8. A spring wheel including inner and outer rims, a plurality of springs on the inner rim having threaded studs extending beyond the outer rim, an adjusting means connected with said threaded studs for adjusting the tension of said springs.

9. A spring wheel including inner and outer rims, a plurality of springs mounted on the inner rim and having free ends fitting upon said outer rim, said springs having threaded studs formed on their free ends, and turnbuckles engaged with said threaded studs whereby the tension of the springs may be increased or decreased upon the adjustment of the turnbuckles.

10. A spring wheel including inner and outer rims, a plurality of springs arranged on the inner rim having curved ends extending beyond the outer rim, chairs on the outer rim having curved ends for receiving the curved ends of the springs, said chairs having recesses and side passages, threaded studs secured to the ends of the said springs, turnbuckles for the threaded studs adapted to be seated in the recesses of the chairs, said passages permitting free access to said turnbuckles, a resilient tire positioned on the outer rim, a supporting member for the tire positioned on the outer rim, said tire having side portions, and securing rings for the tire side portions.

11. A spring wheel including inner and outer rims, a plurality of springs mounted upon the inner rim and having free ends fitting upon said outer rim, chairs positioned upon said outer rim, said chairs comprising bodies having flange portions extending therefrom for retaining the chairs upon said outer rim, said chairs having recesses formed in their bodies and side passages communicating with said recesses, turnbuckles engaged with the free ends of said springs, whereby the tension of said springs may be increased or decreased upon the adjustment of the turnbuckles, said springs bearing upon the bodies of said chairs and said turnbuckles positioned within said recesses, said side passages permitting free access to said turnbuckles.

In testimony whereof I affix my signature in presence of two witnesses.

MELVIN A. MYERS.

Witnesses:
 JOHN H. SCOTT,
 WM. A. FAUL.